(No Model.)

E. E. DILLON.
HORSE BLANKET FASTENER.

No. 377,097. Patented Jan. 31, 1888.

Witnesses
F. H. Schott
Newton Crawford

Inventor.
Ellis E. Dillon.
By his Attorneys
Slade and Ruff

UNITED STATES PATENT OFFICE.

ELLIS E. DILLON, OF NORMAL, ILLINOIS.

HORSE-BLANKET FASTENER.

SPECIFICATION forming part of Letters Patent No. 377,097, dated January 31, 1888.

Application filed December 1, 1887. Serial No. 256,678. (No model.)

*To all whom it may concern:*

Be it known that I, ELLIS E. DILLON, of Normal, in the county of McLean, and in the State of Illinois, have invented certain new and useful Improvements in Horse-Blanket Fasteners; and I do hereby declare that the following is a full, clear, and exact description thereof, reference being had to the accompanying drawings, and to the letters of reference marked thereon, making a part of this specification.

My invention relates to an improvement in horse-blankets, the object of the same being to provide a blanket which may be secured on a horse in such manner as to prevent the same from slipping upon the horse, and one which can be conveniently fastened upon the horse from one side thereof.

A further object is to provide an article of the above character which will be simple and economical in construction and durable and efficient in use; and with these ends in view my invention consists in the certain features of construction and combinations of parts, as will be hereinafter fully described, and pointed out in the claim.

Figure 1:
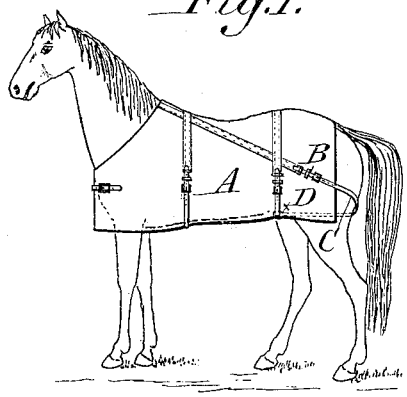
Figure 2:
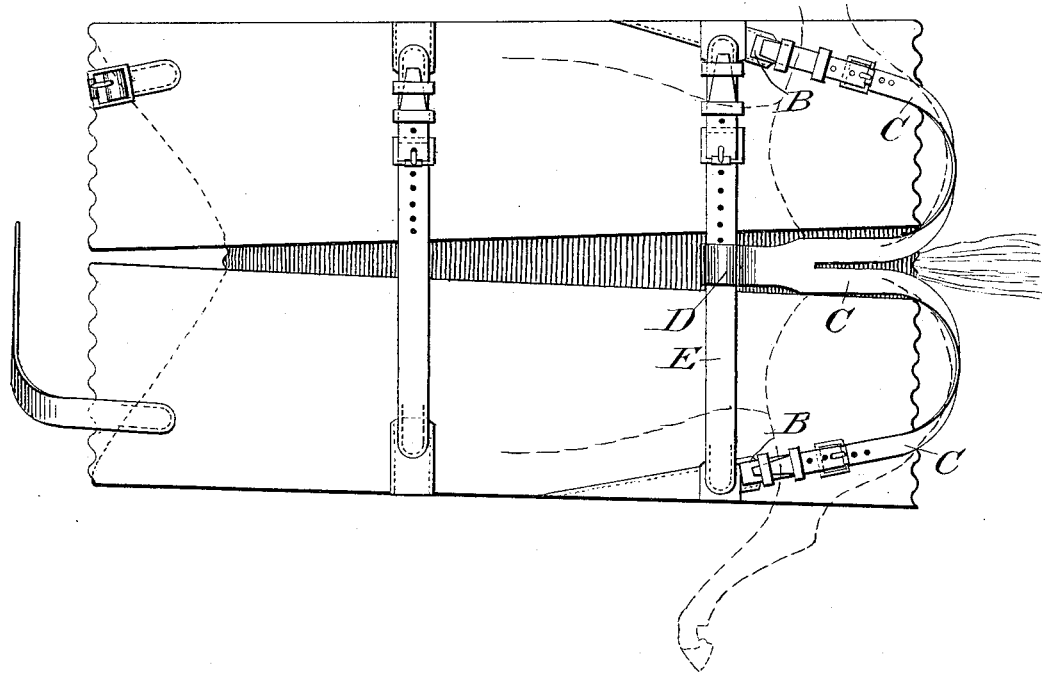

In the accompanying drawings, Figure 1 represents the blanket attached to a horse. Fig. 2 represents a bottom plan view of the blanket, showing its attachment on a horse.

A represents a blanket provided with the straps B, which are secured at the rear of the blanket, on each side thereof, and are adapted to receive the ends of the strap C, the free end of which is provided with the loop D. The said end D is intended to be carried between the hind legs of the horse, in which position it is held by means of the strap E, which passes under the belly of the horse and through the loop D. The blanket thus constructed can be secured on the horse from one side thereof, and a free motion of the hind legs is permitted, as the straps bear only against the legs at the point where the breeching of harness generally touches, thereby avoiding chafing and irritation of the horse in any manner.

Having fully described my invention, what I claim as new, and desire to secure by Letters Patent, is—

The combination, with a horse-blanket, of the straps B, adapted to receive the ends of the strap C, which is provided with a loop on its free end, and the strap E, all arranged to operate substantially as shown and described.

In testimony that I claim the foregoing I have hereunto set my hand this 27th day of October, 1887.

ELLIS E. DILLON.

Witnesses:
 THOS. SLADE,
 S. R. GRIFFITH.